(12) United States Patent
Onoe et al.

(10) Patent No.: US 10,369,520 B2
(45) Date of Patent: Aug. 6, 2019

(54) EXHAUST GAS CLEANING CATALYST

(71) Applicant: Cataler Corporation, Shizuoka (JP)

(72) Inventors: Ryota Onoe, Shizuoka (JP); Tsuyoshi Ito, Shizuoka (JP); Yuki Takesue, Shizuoka (JP); Masatoshi Ikebe, Shizuoka (JP); Chihiro Kasuya, Shizuoka (JP); Yuta Morishita, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 10 days.

(21) Appl. No.: 15/545,418

(22) PCT Filed: Jan. 8, 2016

(86) PCT No.: PCT/JP2016/050513
§ 371 (c)(1),
(2) Date: Jul. 21, 2017

(87) PCT Pub. No.: WO2016/117393
PCT Pub. Date: Jul. 28, 2016

(65) Prior Publication Data
US 2018/0015411 A1    Jan. 18, 2018

(30) Foreign Application Priority Data

Jan. 22, 2015 (JP) ................................ 2015-010702

(51) Int. Cl.
*F01N 3/10* (2006.01)
*F01N 3/28* (2006.01)
(Continued)

(52) U.S. Cl.
CPC ......... *B01D 53/94* (2013.01); *B01D 53/9454* (2013.01); *B01J 23/63* (2013.01);
(Continued)

(58) Field of Classification Search
USPC .......... 60/274, 276, 295, 297, 301; 422/177, 422/180
See application file for complete search history.

(56) References Cited

U.S. PATENT DOCUMENTS 6,939,825 B1 * 9/2005 Ohno ................... B01D 53/945
423/326
7,704,295 B2 * 4/2010 Oshimi .............. B01D 46/2455
422/180

(Continued)

FOREIGN PATENT DOCUMENTS

EP        1 949 959        7/2008
JP        51054085         5/1976
(Continued)

OTHER PUBLICATIONS

Japanese Office Action in JP2015-010702—dated Feb. 28, 2019.

*Primary Examiner* — Binh Q Tran
(74) *Attorney, Agent, or Firm* — Occhiuti & Rohlicek LLP (57) ABSTRACT

The exhaust gas cleaning catalyst according to the present invention is provided with a cylindrical substrate 10 and a catalyst coat layer 20 formed on the surface of the substrate 10. A ratio of the length L in the cylindrical axis direction of the substrate 10 and the diameter D of a cross section orthogonal to the cylindrical axis direction is denoted by (L/D)≤0.8. The coat density of the catalyst coat layer 20 differs between an upstream side portion 10*a* that includes the exhaust gas inlet-side end 16 of the substrate 10 and a downstream side portion 10*b* that includes the exhaust gas outlet-side end 18 of the substrate 10. The coat density A in the upstream side portion 10*a* is lower than the coat density B in the downstream side portion 10*b* (A<B).

5 Claims, 6 Drawing Sheets (51) Int. Cl.
  *B01D 53/94*  (2006.01)
  *B01J 23/63*  (2006.01)
  *B01J 35/00*  (2006.01)
  *B01J 35/04*  (2006.01)

(52) U.S. Cl.
  CPC ........... *B01J 35/0006* (2013.01); *B01J 35/04* (2013.01); *F01N 3/101* (2013.01); *F01N 3/28* (2013.01); *B01D 2255/1023* (2013.01); *B01D 2255/1025* (2013.01); *B01D 2255/407* (2013.01); *B01D 2255/905* (2013.01); *B01D 2255/908* (2013.01); *B01D 2255/9032* (2013.01); *B01D 2255/9202* (2013.01); *B01D 2258/01* (2013.01); *B01J 35/0026* (2013.01); *B01J 2523/00* (2013.01); *F01N 2330/60* (2013.01); *Y02T 10/22* (2013.01)

(56) References Cited

U.S. PATENT DOCUMENTS

| | | | |
|---|---|---|---|
| 9,757,675 B2* | 9/2017 | He | B01D 46/2459 |
| 2009/0229260 A1 | 9/2009 | Ogura | |
| 2011/0200505 A1 | 8/2011 | Cavataio et al. | |
| 2012/0213674 A1 | 8/2012 | Schuetze et al. | |
| 2012/0251402 A1* | 10/2012 | Goto | B01D 46/2474 422/180 |
| 2014/0041366 A1 | 2/2014 | Seyler et al. | |
| 2015/0004353 A1* | 1/2015 | Hayashi | F01N 3/2828 428/116 |
| 2015/0238951 A1 | 8/2015 | Aoki et al. | |
| 2017/0232429 A1* | 8/2017 | Aoki | B01J 37/0244 428/117 |

FOREIGN PATENT DOCUMENTS

| | | |
|---|---|---|
| JP | 2007-125524 | 5/2007 |
| JP | 2007-330879 | 12/2007 |
| JP | 2008-302355 | 12/2008 |
| JP | 2009-285605 | 12/2009 |
| JP | 2010-005592 | 1/2010 |
| JP | 2010-516445 | 5/2010 |
| JP | 2014-100658 | 6/2014 |
| WO | WO2008/088649 | 7/2008 |
| WO | WO2009/144573 | 12/2009 |
| WO | WO2012/079598 | 6/2012 |

* cited by examiner

EXHAUST GAS CLEANING CATALYST

CROSS REFERENCE TO RELATED APPLICATIONS

This application is a National Stage of International Application No. PCT/JP2016/050513 filed on Jan. 8, 2016, which claims priority to Japanese Application No. 2015-010702 filed on Jan. 22, 2015, the contents of which are hereby incorporated by reference in their entirety.

TECHNICAL FIELD

The present invention relates to an exhaust gas cleaning catalyst. More specifically, the present invention relates to an exhaust gas cleaning catalyst provided with a substrate and a catalyst coat layer formed on a surface of the substrate.

Moreover, the present international application claims priority on the basis of Japanese Patent Application No. 2015-10702, which was filed on 22 Jan. 2015, and all the details of that application are incorporated by reference in the present specification.

BACKGROUND ART

Three-way catalysts containing at least one noble metal selected from among Pt (platinum), Pd (palladium) and Rh (rhodium) are widely used to clean exhaust gases discharged from internal combustion engines such as automobile engines. In a typical constitution of such a three-way catalyst, a catalyst coat layer is formed on a surface of a cylindrical honeycomb substrate, and one or two or more noble metals selected from among Pt, Pd and Rh are supported on the surface of the catalyst coat layer. When cleaning exhaust gas using such a honeycomb substrate, the exhaust gas is caused to flow into cells of the substrate from the exhaust gas inlet-side end, the exhaust gas is brought into contact with the catalyst coat layer formed on surfaces of dividing walls that divide the cells, and the exhaust gas is then discharged to the outside from the exhaust gas outlet-side end (for example, see Patent Literature 1).

CITATION LIST

Patent Literature

Patent Literature 1: Japanese Patent Application Publication No. 2014-100658

SUMMARY OF INVENTION

Technical Problem

Here, in order to improve the exhaust gas cleaning efficiency, it is advantageous to increase the mass of the catalyst coat layer per 1 L of substrate (the coat density) so as to increase the surface area of the catalyst coat layer. However, simply increasing the coat density of the catalyst coat layer leads to an increase in pressure loss when exhaust gas passes through cells in the substrate and has an adverse effect on engine performance and the like. In order to prevent a deterioration in fuel economy and problems such as engine malfunctions, it is preferable to suppress an increase in pressure loss as far as possible. The present invention solves the above-mentioned problems.

Solution to Problem

The exhaust gas cleaning catalyst provided by the present invention is an exhaust gas cleaning catalyst which is disposed in the exhaust pathway of an internal combustion engine and cleans exhaust gas emitted by the internal combustion engine. This exhaust gas cleaning catalyst is provided with a cylindrical substrate and a catalyst coat layer formed on a surface of the substrate. A ratio of the length L in a cylindrical axis direction of the substrate and the diameter D of a cross section orthogonal to the cylindrical axis direction is denoted by (L/D)≤0.8. A coat density of the catalyst coat layer differs between an upstream side portion that includes an exhaust gas inlet-side end of the substrate and a downstream side portion that includes an exhaust gas outlet-side end of the substrate. In addition, the coat density A in the upstream side portion is lower than the coat density B in the downstream side portion (A<B).

According to this configuration, an increase in pressure loss when exhaust gas passes through cells of a substrate in an exhaust gas cleaning catalyst having a relatively short substrate length, such as one in which the (L/D) ratio is 0.8 or less, can be reduced in comparison with a conventional catalyst. Therefore, it is possible to prevent a deterioration in fuel economy and problems such as engine malfunctions and provide an exhaust gas cleaning catalyst having higher performance.

In a preferred aspect of the exhaust gas cleaning catalyst disclosed here, a relationship between the coat density A in the upstream side portion and the coat density B in the downstream side portion satisfies (A/B)≤0.85. In this way, an advantageous effect (a pressure loss increase suppression effect) can be more reliably achieved by making the coat density A in the upstream side portion lower than the coat density B in the downstream side portion.

In a preferred aspect of the exhaust gas cleaning catalyst disclosed here, the coat density A in the upstream side portion is lower than the coat density B in the downstream side portion by 30 g/L or more. In this way, an advantageous effect (a pressure loss increase suppression effect) can be more effectively achieved by making the coat density A in the upstream side portion lower than the coat density B in the downstream side portion.

In a preferred aspect of the exhaust gas cleaning catalyst disclosed here, the catalyst coat layer contains an OSC material having oxygen storage capacity. When an average coat density throughout the catalyst coat layer is denoted by C, the coat density A in the upstream side portion is denoted by 0.5 C≤A≤0.9 C. In this way, it is possible to effectively improve the oxygen storage capacity (OSC) performance of the OSC material while suppressing an increase in pressure loss in an exhaust gas cleaning catalyst in which the coat density A in the upstream side portion is lower than the coat density B in the downstream side portion. Therefore, according to this configuration, it is possible to provide an optimal exhaust gas cleaning catalyst in which the balance between pressure loss reduction and oxygen storage capacity (OSC) performance is better than in a conventional catalyst.

In a preferred aspect of the exhaust gas cleaning catalyst disclosed here, the upstream side portion includes a portion corresponding to at least 40% of the length of the substrate from the exhaust gas inlet-side end towards the exhaust gas outlet-side end of the substrate. In addition, the downstream side portion includes a portion corresponding to at least 40% of the length of the substrate from the exhaust gas outlet-side end towards the exhaust gas inlet-side end of the substrate. By using a portion corresponding to at least 40% of the length of the substrate from the exhaust gas inlet-side end towards the exhaust gas outlet-side end of the substrate as the upstream side portion and using a portion corresponding to at least 40% of the length of the substrate from the exhaust gas outlet-side end towards the exhaust gas inlet-side end of the substrate as the downstream side portion, it is possible to more effectively achieve a reduction in pressure loss and an improvement in catalyst cleaning performance.

In a preferred aspect of the exhaust gas cleaning catalyst disclosed here, the length L in the cylindrical axis direction of the substrate is 70 mm or less, and the diameter D of a cross section orthogonal to the cylindrical axis direction is 85 mm or more. According to the invention of the present aspect, an increase in pressure loss can be better suppressed when exhaust gas flows through cells in this type of exhaust gas cleaning catalyst in which the length in the cylindrical axis direction of the substrate is relatively short.

DESCRIPTION OF EMBODIMENTS

Based on the drawings, explanations will now be given of preferred embodiments of the present invention. Moreover, matters which are essential for carrying out the invention (for example, ordinary matters such as those relating to the arrangement of the exhaust gas cleaning catalyst) and which are matters other than those explicitly mentioned in this specification (for example, the composition of the porous carrier, and the like) are matters that a person skilled in the art could understand to be matters of design on the basis of the prior art in this technical field. The present invention can be carried out on the basis of the matters disclosed in the present specification and common general technical knowledge in this technical field.

The exhaust gas cleaning catalyst disclosed here comprises a substrate and a catalyst coat layer formed on a surface of the substrate.

Figure 1:
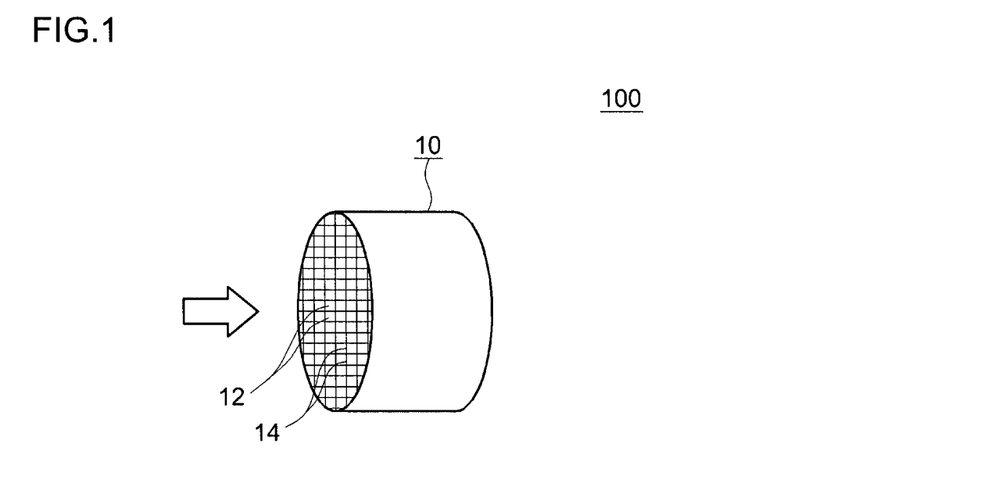
FIG. 1 is a schematic block diagram that illustrates an exhaust gas cleaning catalyst according to one embodiment of the present invention.

FIG. 1 is a schematic diagram showing a typical example of an exhaust gas cleaning catalyst. The exhaust gas cleaning catalyst 100 according to the present embodiment includes a cylindrical honeycomb substrate 10 having a plurality of regularly arranged cells 12 and rib walls 14 that constitute these cells 12.

The substrate 10 that constitutes the exhaust gas cleaning catalyst 100 disclosed here can use a variety of materials and forms that were used in the past in this type of application. For example, a honeycomb substrate having a honeycomb structure formed from a ceramic such as cordierite or silicon carbide (SiC) or an alloy (stainless steel or the like) can be advantageously used. In this embodiment, the honeycomb substrate 10 is formed into an approximately cylindrical shape that extends in the exhaust gas flow direction (shown by the arrows in FIG. 1 and FIG. 2). One example is a honeycomb substrate having a cylindrical shape, wherein through holes (cells) are provided as exhaust gas pathways in the cylindrical axis direction of the honeycomb substrate and an exhaust gas can come into contact with dividing walls (rib walls) that divide the cells.

<(L/D) Ratio in Substrate>

Figure 4:
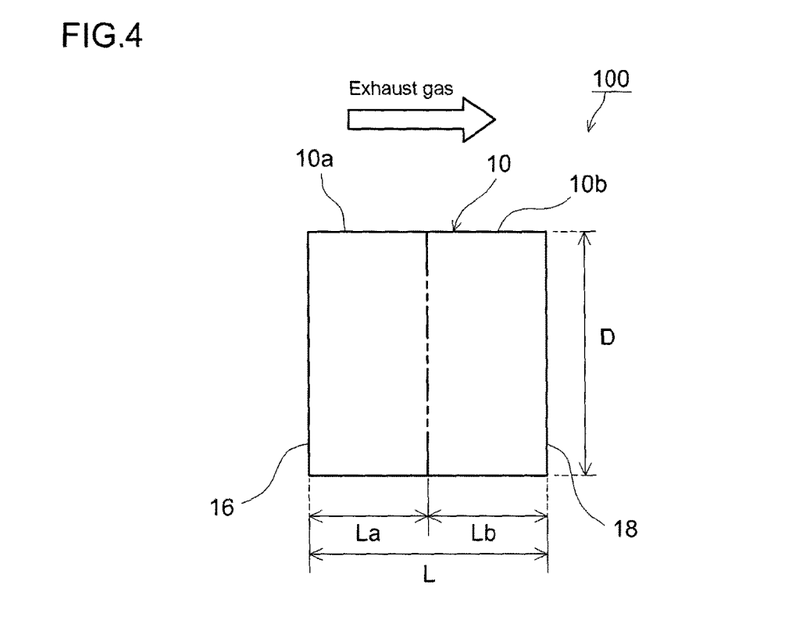
FIG. 4 is a lateral schematic view that illustrates an exhaust gas cleaning catalyst according to one embodiment of the present invention.

As shown in FIG. 4, the exhaust gas cleaning catalyst 100 disclosed here is such that the ratio (L/D) of the length L in the cylindrical axis direction of the substrate 10 and the diameter D of a cross section orthogonal to the cylindrical axis direction is such that (L/D)≤0.8. This size ratio (L/D) should be, for example, 0.3 to 0.8, but is preferably 0.7 or lower (for example, 0.4 to 0.7), and is particularly preferably 0.6 or lower (for example, 0.5 to 0.6). The length L in the cylindrical axis direction of the substrate 10 is not particularly limited, but should be approximately 70 mm or less (for example, 30 mm to 70 mm), and is preferably 60 mm or less (for example, 40 mm to 60 mm). The diameter D of the substrate 10 is not particularly limited, but should be approximately 85 mm or more (for example, 85 mm to 150 mm), and is preferably 100 mm or more (for example, 100 mm to 120 mm). The length L and diameter D of the substrate can be measured using a well-known length measuring device, such as a gauge scale.

<Catalyst Coat Layer 20>

Figure 2:
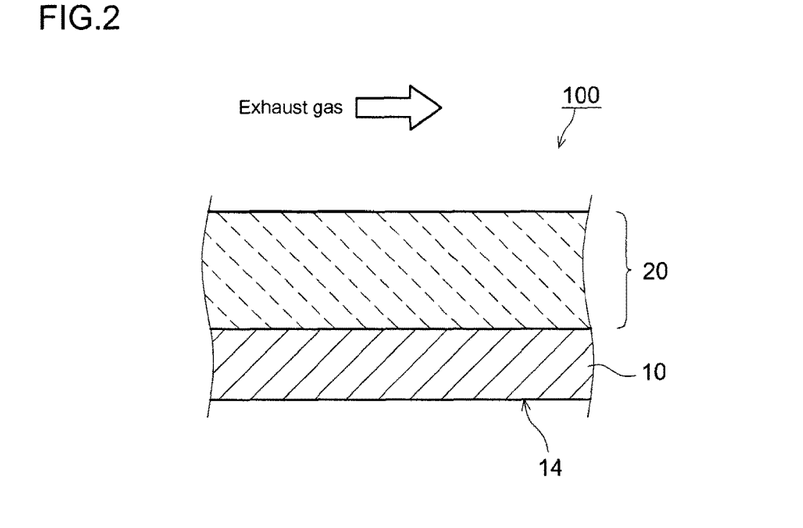
FIG. 2 is a diagram that schematically illustrates a rib wall portion in an exhaust gas cleaning catalyst according to one embodiment of the present invention.

FIG. 2 is a diagram that schematically illustrates the constitution of a surface portion of a rib wall 14 in the honeycomb substrate 10 shown in FIG. 1. In the exhaust gas cleaning catalyst 100 disclosed here, a catalyst coat layer 20 is formed on the substrate 10. In the exhaust gas cleaning catalyst 100 having the configuration shown in FIG. 2, the catalyst coat layer 20 is formed on surfaces of rib walls 14 in the substrate 10. Exhaust gas supplied to the exhaust gas cleaning catalyst 100 flows into pathways in the substrate 10, and harmful components are eliminated by coming into contact with the catalyst coat layer 20. The catalyst coat layer 20 includes a plurality of noble metal catalysts and a carrier that supports these noble metal catalysts.

<Noble Metal Catalyst>

The plurality of noble metal catalysts contained in the catalyst coat layer 20 should exhibit a catalytic function against harmful components contained in exhaust gas. For example, palladium (Pd), rhodium (Rh), platinum (Pt), ruthenium (Ru), iridium (Ir), osmium (Os), and the like, can be used as noble metal catalysts.

<Carrier>

The catalyst coat layer 20 is formed by supporting the noble metal catalysts on a carrier (typically a powder). The carrier that supports the noble metal catalysts is preferably one that contains an OSC material having oxygen storage capacity. Examples of the OSC material carrier include cerium oxide (ceria: $CeO_2$) and ceria-containing composite oxides (for example, ceria-zirconia composite oxides ($CeO_2$—$ZrO_2$ composite oxides)). Of these OSC materials, the use of $CeO_2$—$ZrO_2$ composite oxides is preferred. By forming a solid solution of $ZrO_2$ in $CeO_2$, $CeO_2$ grain growth is suppressed and it is possible to suppress a deterioration in OSC performance after use over a long period of time. The blending ratio of $CeO_2$ and $ZrO_2$ in the $CeO_2$—$ZrO_2$ composite oxide is such that the $CeO_2/ZrO_2$ ratio is 0.2 to 0.5 (preferably 0.25 to 0.4, and more preferably approximately 0.3). By setting the $CeO_2/ZrO_2$ ratio to fall within the range mentioned above, high OSC (oxygen storage capacity) can be achieved.

The $CeO_2$—$ZrO_2$ composite oxide may also contain other compounds (typically inorganic oxides) as secondary components. Rare earth elements such as lanthanum, alkaline earth elements such as calcium, and transition metals can be used as such compounds. Of these, rare earth elements such as lanthanum can be advantageously used as stabilizers in order to improve the specific surface area of the composite oxide at high temperatures without impairing the function of the catalyst. For example, rare earth oxides such as $La_2O_3$, $Y_2O_3$ and $Pr_6O_{11}$ can be incorporated in order to suppress sintering or the like. These rare earth oxides may be physically mixed as individual oxides in a carrier powder, and can be a single component of the composite oxide. The content (mixing ratio) of these secondary components is preferably 2% to 30% (for example, 3% to 6%) of the overall carrier. If the content of secondary components is too high, the quantity of $ZrO_2$ or $CeO_2$ shows a relative decrease, which can cause a deterioration in heat resistance and OSC performance.

The carrier that supports noble metal catalysts in the catalyst coat layer 20 disclosed here may be a carrier material other than an OSC material (a non-OSC material). Examples of such carrier materials include metal oxides such as aluminum oxide (alumina: $Al_2O_3$), zirconium oxide (zirconium: $ZrO_2$), silica ($SiO_2$), magnesia (MgO) and titanium oxide (titania: $TiO_2$), and solid solutions of these. It is possible to use a combination of two or more types of these carrier materials. Of these, alumina is preferred. Alumina exhibits higher durability (and especially heat resistance) than $CeO_2$—$ZrO_2$ composite oxides. Therefore, thermal stability of the overall catalyst coat layer is improved by incorporating alumina. It is preferable for the alumina and the $CeO_2$—$ZrO_2$ composite oxide to be mixed at a blending ratio by mass ($CeO_2$—$ZrO_2$ composite oxide/alumina) of between 1/3 and 4/1 (preferably between 1/2 and 3/1, and more preferably between 1/1 and 3/1 (for example, 2/1)). According to this constitution, because the ratio of the alumina and the $CeO_2$—$ZrO_2$ composite oxide achieves an appropriate balance, high OSC (oxygen storage capacity) can be exhibited while durability can be increased by means of the alumina. The plurality of noble metal catalysts may be supported on different carriers.

The quantity of noble metal catalyst supported on the carrier is not particularly limited, but should be 0.01 mass % to 2 mass % (for example, 0.05 mass % to 1 mass %) relative to the mass of the carrier that supports noble metals in the catalyst coat layer 20. The method for supporting noble metals on the carrier of the catalyst coat layer 20 is not particularly limited. For example, it is possible to immerse a carrier powder containing $Al_2O_3$ and/or a $CeO_2$—$ZrO_2$ composite oxide in an aqueous solution containing a noble metal salt (for example, a nitrate) or a noble metal complex (for example, a tetraammine complex), and then dry and fire the powder.

Here, in order to improve exhaust gas cleaning efficiency in the exhaust gas cleaning catalyst 100 described above, it is preferable to increase the mass of the catalyst coat layer 20 per 1 L of the substrate 10 (the coat density) so as to increase the surface area of the catalyst coat layer 20. However, simply increasing the coat density of the catalyst coat layer 20 leads to an increase in pressure loss when exhaust gas passes through the substrate 10 and has an adverse effect on engine performance and the like. In order to prevent a deterioration in fuel economy and problems such as engine malfunctions, it is preferable to suppress an increase in pressure loss as far as possible.

As a result of a variety of experiments, the inventors of the present invention found that in an exhaust gas cleaning catalyst in which the length of the substrate was relatively long, whereby the ratio of the length L and the diameter D of the substrate (L/D) was higher than 0.8, a lower coat density in the downstream side portion of the substrate was advantageous in terms of reducing pressure loss, whereas in an exhaust gas cleaning catalyst in which the length of the substrate was relatively short, whereby the (L/D) ratio was 0.8 or less (the present embodiment), a lower coat density in the upstream side portion of the substrate was advantageous in terms of reducing pressure loss. More specifically, a plurality of exhaust gas catalysts were prepared by forming a catalyst coat layer at the same coat density on substrates having different lengths, and pressure loss was measured at different gas flow rates. Of these, the results of pressure loss measurements for exhaust gas cleaning catalysts having substrate lengths of 85 mm and 60 mm (and the same cross section diameter of 103 mm) are shown in the graph in FIG. 3. The left side of FIG. 3 shows results for a catalyst having a substrate length of 85 mm, and the right side of FIG. 3 shows results for a catalyst having a substrate length of 60 mm.

Figure 3:
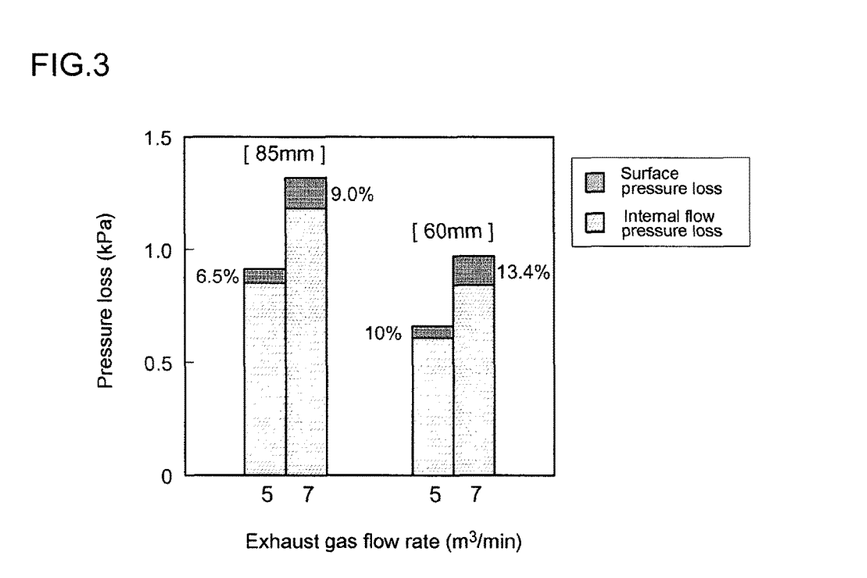
FIG. 3 is a graph that compares pressure losses in exhaust gas cleaning catalysts having different lengths.

As shown in FIG. 3, the exhaust gas cleaning catalyst having a substrate length of 60 mm showed a significant reduction in pressure loss compared to the exhaust gas cleaning catalyst having a substrate length of 85 mm. According to findings by the inventors of the present invention, pressure loss when an exhaust gas passes through a substrate is divided into surface pressure loss when exhaust gas flows in from the exhaust gas inlet-side end of the substrate (entry pressure loss) and internal flow pressure loss when exhaust gas flows inside cells in the substrate. The catalyst having a substrate length of 60 mm had similar entry pressure loss to the catalyst having a substrate length of 85 mm, but had a lower overall pressure loss because the internal flow pressure loss was lower. This means that a catalyst having a shorter substrate length has a small contribution from internal flow pressure loss and a large contribution from entry pressure loss. That is, a catalyst having a shorter substrate length can effectively reduce pressure loss if the coat density in the upstream side portion of the substrate is reduced and the opening area at the exhaust gas inlet-side end is increased.

<Upstream Side Portion and Downstream Side Portion>

In view of findings such as those mentioned above, the exhaust gas cleaning catalyst 100 disclosed here is constituted from an upstream side portion 10a and a downstream side portion 10b as schematically shown in FIG. 4. The upstream side portion 10a is a portion that includes the exhaust gas inlet-side end 16 of the substrate 10, and the downstream side portion 10b is a portion that includes the exhaust gas outlet-side end 18 of the substrate 10. In this embodiment, the upstream side portion 10a is a portion that corresponds to at least 40% (that is, at least ⅖ of the overall length of the substrate, and preferably 40% to 60%, that is, ⅖ to ⅗ of the overall length of the substrate) of the length of the substrate 10 from the exhaust gas inlet-side end (upstream end) 16 towards the exhaust gas outlet-side end (downstream end) of the substrate 10. The downstream side portion 10b is a portion that corresponds to at least 40% (that is, at least ⅖ of the overall length of the substrate, and preferably 40% to 60%, that is, ⅖ to ⅗ of the overall length of the substrate) of the length of the substrate 10 from the exhaust gas outlet-side end (downstream end) 18 towards the exhaust gas inlet-side end (upstream end) of the substrate 10. In this embodiment, the downstream side portion 10b is the portion that is not the upstream side portion 10a. That is, the downstream side portion 10b is a portion that is located further downstream than the upstream side portion 10a. In a preferred aspect, if the overall length of the substrate is denoted by L, the overall length of the upstream side portion 10a is denoted by La and the overall length of the downstream side portion 10b is denoted by Lb, then La=0.4 L to 0.6 L and La+Lb=L.

<Coat Density of Upstream Side Portion and Downstream Side Portion>

In order to reduce pressure loss, the upstream side portion 10a is constituted in such a way that the coat density A (that is, the mass per 1 L of substrate) of the catalyst coat layer 20 in the upstream side portion 10a is lower than the coat density B in the downstream side portion 10b. In order to improve the cleaning performance of the catalyst, however, the downstream side portion 10b is constituted in such a way that the coat density B of the catalyst coat layer 20 in the downstream side portion 10b is greater than the coat density A in the upstream side portion 10a (A<B).

The coat density A in the upstream side portion 10a is not particularly limited as long as this is lower than the coat density B in the downstream side portion 10b. In the exhaust gas cleaning catalyst 100 disclosed here, the relationship between the coat density A in the upstream side portion 10a and the coat density B in the downstream side portion 10b is preferably such that the relationship (A/B)≤0.85 is satisfied, more preferably such that the relationship (A/B)≤0.6 is satisfied, and particularly preferably such that the relationship (A/B)≤0.4 is satisfied. Meanwhile, an exhaust gas cleaning catalyst in which the coat density ratio (A/B) is lower than 0.1 tends to exhibit reduced cleaning performance by the catalyst. From the perspective of maintaining cleaning performance, it is preferable for the relationship 0.1≤(A/B) (and especially the relationship 0.2≤(A/B)) to be satisfied. For example, an exhaust gas cleaning catalyst having a coat density ratio (A/B) of 0.1 to 0.85 (and especially 0.2 to 0.6) is suitable from the perspective of achieving both a reduction in pressure loss and an improvement in cleaning performance.

From the perspective of reducing pressure loss, it is preferable for the coat density A in the upstream side portion 10a to be lower than the coat density B in the downstream side portion 10b by at least 30 g/L (for example, 30 g/L to 300 g/L). In the exhaust gas cleaning catalyst disclosed here, it is preferable for the coat density A in the upstream side portion 10a to be lower than the coat density B in the downstream side portion 10b by, for example, at least 140 g/L (for example, at least 200 g/L). In such cases, a better pressure loss reduction effect can be achieved. From the perspective of reducing pressure loss, the coat density A in the upstream side portion 10a is, for example, preferably 180 g/L or less, more preferably 170 g/L or less, and particularly preferably 100 g/L or less. For example, the coat density A in the upstream side portion 10a is preferably 50 g/L to 180 g/L, and particularly preferably 60 g/L to 170 g/L. In addition, from the perspective of improving cleaning performance, the coat density B in the downstream side portion 10b is preferably 200 g/L or more, more preferably 250 g/L or more, and particularly preferably 300 g/L or more. For example, the coat density B in the downstream side portion 10b is preferably 200 g/L to 400 g/L, and particularly preferably 250 g/L to 320 g/L.

<Average Coat Density Throughout Catalyst Coat Layer>

The average coat density C throughout the catalyst coat layer 20 is not particularly limited, but should be approximately 100 g/L to 350 g/L, and is preferably 150 g/L to 300 g/L, more preferably 180 g/L to 280 g/L, and particularly preferably 190 g/L to 260 g/L. If the average coat density C throughout the catalyst coat layer 20 falls within such a range, it is possible to effectively reduce pressure loss while maintaining cleaning performance.

In a preferred aspect, the coat density A in the upstream side portion 10a relative to the average coat density C throughout the catalyst coat layer 20 is such that 0.5 C≤A≤0.9 C, and preferably such that 0.6 C≤A≤0.8 C. In this way, it is possible to effectively improve the oxygen storage capacity (OSC) performance of the OSC material while suppressing an increase in pressure loss in an exhaust gas cleaning catalyst 100 in which the coat density A in the upstream side portion 10a is lower than the coat density B in the downstream side portion 10b. Therefore, according to the configuration described above, it is possible to achieve an optimal exhaust gas cleaning catalyst 100 that exhibits a better balance between a reduction in pressure loss and oxygen storage capacity than a conventional catalyst.

(Experimental Example 1)

Explanations will now be given of experimental examples relating to the present invention, but it is not intended that the present invention is limited to these experimental examples.

<Working Example 1>

A slurry was prepared by dispersing, in an aqueous solution, a powder obtained by supporting Rh on a $CeO_2$—$ZrO_2$ composite oxide (a carrier), which is an OSC material, and a powder obtained by supporting Pd on alumina. A portion corresponding to 40% of the overall length L from one end in the axial direction of the honeycomb substrate 10 shown in FIG. 4 (a cylinder having a length L of 60 mm and a diameter D of 103 mm) was wash coated with this slurry, and then dried and fired so as to form the catalyst coat layer 20 on a surface of the substrate 10. This portion serves as the upstream side portion 10a of the exhaust gas cleaning catalyst. The coat density A of the catalyst coat layer 20 in the upstream side portion 10a (mass per 1 L of substrate (in this case, per 1 L of overall bulk volume including the volume of cell pathways in the pure volume of the honeycomb substrate. This is the same hereinafter)) was 166 g/L.

In addition, the remaining portion of the substrate 10 was wash coated with this slurry, and then dried and fired so as to form the catalyst coat layer 20 on the surface of the substrate 10. This portion serves as the downstream side portion 10b of the exhaust gas cleaning catalyst. The coat density B of the catalyst coat layer 20 in the downstream side portion 10b was 306 g/L. In addition, the average coat density C throughout the catalyst coat layer 20 was 250 g/L.

In this way, an exhaust gas cleaning catalyst was prepared in such a way that the coat density of the catalyst coat layer 20 was different between the upstream side portion 10a and the downstream side portion 10b.

<Comparative Example 1>

The upstream side portion 10a was formed on a portion corresponding to 60% of the overall length L from one end in the axial direction of the honeycomb substrate 10. The downstream side portion 10b was formed on the remaining portion of the substrate 10. The coat density A in the upstream side portion 10a was 306 g/L, and the coat density B in the downstream side portion 10b was 166 g/L. Other than this, an exhaust gas cleaning catalyst was prepared using the same procedure as that used in Working Example 1.

<Comparative Example 2>

A cylinder having a length L in the cylindrical axis direction of 105 mm and a diameter D of 103 mm was used as the honeycomb substrate 10. The upstream side portion 10a was formed on a portion corresponding to 50% of the overall length L from one end in the axial direction of the honeycomb substrate 10. The downstream side portion 10b was formed on the remaining portion of the substrate 10. The coat density A in the upstream side portion 10a was 60 g/L, the coat density B in the downstream side portion 10b was 205 g/L, and the average coat density C throughout the catalyst coat layer 20 was 132.5 g/L. Other than this, an exhaust gas cleaning catalyst was prepared using the same procedure as that used in Working Example 1.

<Comparative Example 3>

The coat density A in the upstream side portion 10a was 205 g/L, and the coat density B in the downstream side portion 10b was 60 g/L. Other than this, an exhaust gas cleaning catalyst was prepared using the same procedure as that used in Comparative Example 2.

<Comparative Example 4>

A cylinder having a length L in the cylindrical axis direction of 155 mm and a diameter D of 103 mm was used as the honeycomb substrate 10. The upstream side portion 10a was formed on a portion corresponding to 50% of the overall length L from one end in the axial direction of the honeycomb substrate 10. The downstream side portion 10b was formed on the remaining portion of the substrate 10. The coat density A in the upstream side portion 10a was 60 g/L, the coat density B in the downstream side portion 10b was 205 g/L, and the average coat density C throughout the catalyst coat layer 20 was 132.5 g/L. Other than this, an exhaust gas cleaning catalyst was prepared using the same procedure as that used in Working Example 1.

<Comparative Example 5>

The coat density A in the upstream side portion 10a was 205 g/L, and the coat density B in the downstream side portion 10b was 60 g/L. Other than this, an exhaust gas cleaning catalyst was prepared using the same procedure as that used in Comparative Example 4.

<Measurement of Pressure Loss>

The exhaust gas cleaning catalyst of each example was placed on a blower type pressure loss measurement device, and the pressure loss was measured from the difference in front and back static pressure. Here, pressure loss was measured at different air flow rates of 5 m$^3$/min or 7 m$^3$/min. The results are shown in Table 1.

Examples 4 and 5 had a substrate size ratio (L/D) of 1.5. In these samples, Comparative Example 5, in which the coat density in the upstream side portion was greater than in the downstream side portion, exhibited a lower pressure loss than Comparative Example 4. Meanwhile, the exhaust gas cleaning catalysts of Working Example 1 and Comparative Example 1 had a substrate size ratio (L/D) of 0.58. In these samples, Working Example 1, in which the coat density in the upstream side portion was lower than in the downstream side portion, exhibited a lower pressure loss than Comparative Example 1. In catalysts having relatively long substrate lengths, such as Comparative Examples 2 to 5, because the impact of internal flow pressure loss is greater than surface pressure loss, it is surmised that a higher coat density in the downstream side portion tends to lead to an increase in pressure loss, but in catalysts having relatively short substrate lengths, such as Working Example 1 and Comparative Example 1, because the impact of surface pressure loss is greater than that of internal flow pressure loss, it is surmised that a higher coat density in the upstream side portion tends to lead to an increase in pressure loss. In view of these results, it was confirmed that pressure loss could be effectively reduced by setting the coat density in the upstream side portion to be lower than the coat density in the downstream side portion in an exhaust gas cleaning catalyst having a low substrate size ratio (L/D).

(Experimental Example 2)

In the present example, the following experiment was carried out in order to confirm the impact of coat density in the upstream side portion and downstream side portion on pressure loss and OSC. That is, exhaust gas cleaning catalysts were prepared so as to have a variety of coat densities in the upstream side portion and downstream side portion in the exhaust gas cleaning catalyst production process in Working Example 1.

<Working Example 2>

The coat density A in the upstream side portion 10a was 80 g/L, the coat density B in the downstream side portion 10b was 271.6 g/L, and the average coat density C throughout the catalyst coat layer 20 was 195 g/L. Other than this,

TABLE 1

| | Upstream side portion | | Downstream side portion | | Overall Average | Substrate size | | | Pressure loss (kPa) | |
|---|---|---|---|---|---|---|---|---|---|---|
| | Width (%) | Density A (g/L) | Width (%) | Density B (g/L) | density C (g/L) | Length L (mm) | Diameter D (mm) | L/D | 5 m$^3$/min | 7 m$^3$/min |
| Working Example 1 | 40 | 166 | 60 | 306 | 250 | 60 | 103 | 0.58 | 0.69 | 1.02 |
| Comparative Example 1 | 60 | 306 | 40 | 166 | 250 | 60 | 103 | 0.58 | 0.73 | 1.1 |
| Comparative Example 2 | 50 | 60 | 50 | 205 | 132.5 | 105 | 103 | 1.02 | 0.81 | 1.16 |
| Comparative Example 3 | 50 | 205 | 50 | 60 | 132.5 | 105 | 103 | 1.02 | 0.78 | 1.13 |
| Comparative Example 4 | 50 | 60 | 50 | 205 | 132.5 | 155 | 103 | 1.5 | 1.56 | 2.23 |
| Comparative Example 5 | 50 | 205 | 50 | 60 | 132.5 | 155 | 103 | 1.5 | 1.52 | 2.17 |

As shown in Table 1, the exhaust gas cleaning catalysts of Comparative Examples 2 and 3 had a substrate size ratio (L/D) of 1.02. In these samples, Comparative Example 3, in which the coat density in the upstream side portion was greater than in the downstream side portion, exhibited a lower pressure loss than Comparative Example 2. In addition, the exhaust gas cleaning catalysts of Comparative an exhaust gas cleaning catalyst was prepared using the same procedure as that used in Working Example 1.

<Working Example 3>

The coat density A in the upstream side portion 10a was 100 g/L, the coat density B in the downstream side portion 10b was 258.3 g/L, and the average coat density C throughout the catalyst coat layer 20 was 195 g/L. Other than this, an exhaust gas cleaning catalyst was prepared using the same procedure as that used in Working Example 1.

<Working Example 4>

The coat density A in the upstream side portion 10a was 175 g/L, the coat density B in the downstream side portion 10b was 208.3 g/L, and the average coat density C throughout the catalyst coat layer 20 was 195 g/L. Other than this, an exhaust gas cleaning catalyst was prepared using the same procedure as that used in Working Example 1.

<Comparative Example 6>

The coat density A in the upstream side portion 10a was 195 g/L, the coat density B in the downstream side portion 10b was 195 g/L, and the average coat density C throughout the catalyst coat layer 20 was 195 g/L. Other than this, an exhaust gas cleaning catalyst was prepared using the same procedure as that used in Working Example 1.

Figure 5:
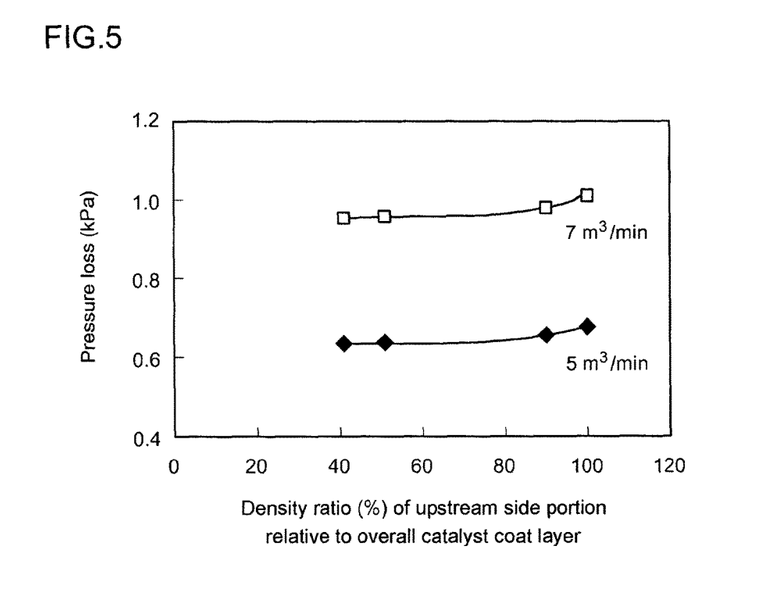
FIG. 5 is a graph showing the relationship between the density proportion (100×A/C) of the upstream side portion and pressure loss.

The exhaust gas cleaning catalyst of each example was measured using the same procedure as in <Measurement of Pressure Loss>. The results are shown in Table 2 and FIG. 5. FIG. 5 is a graph showing the relationship between pressure loss and the density proportion (100×A/C) of coat density A in the upstream side portion 10a relative to the average coat density C throughout the catalyst coat layer.

<OSC Evaluation Test>

Figure 6:
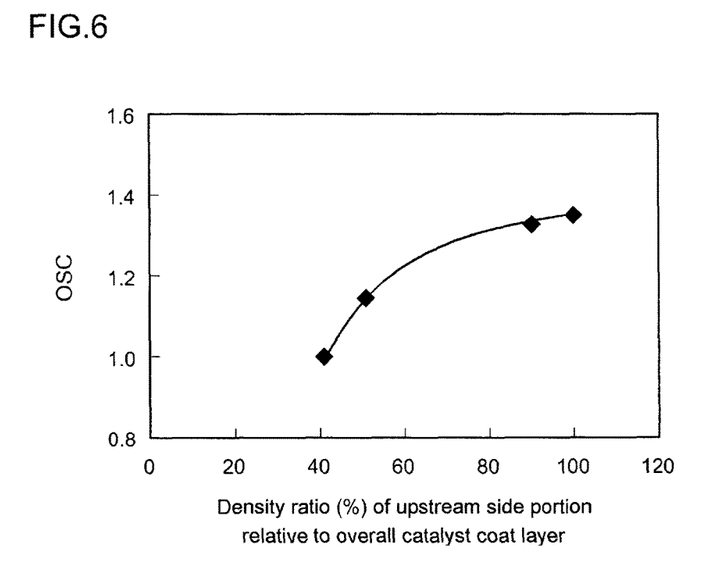
FIG. 6 is a graph showing the relationship between the density proportion (100×A/C) of the upstream side portion and OSC.

The oxygen storage capacity (OSC) of the exhaust gas cleaning catalyst of each example was evaluated. More specifically, the exhaust gas cleaning catalyst of each example was fitted to the exhaust system of an engine having a capacity of 2.4 L. In addition, an $O_2$ sensor was fitted downstream of the sample. Next, the air/fuel ratio A/F of the mixed gas supplied to the engine was altered to the rich side or lean side according to the output from the $O_2$ sensor, the excess or shortfall in terms of oxygen quantity was calculated from the quantity of fuel injected and the A/F, and the average oxygen storage capacity was calculated. The results are shown in Table 2 and FIG. 6. FIG. 6 is a graph showing the relationship between OSC and the density proportion (100×A/C) of coat density A in the upstream side portion 10a relative to the average coat density C throughout the catalyst coat layer. Moreover, in Table 2 and FIG. 6, the OSC value for each example is a relative value, with the OSC value of Working Example 2 being deemed to be 1.

to enter the exhaust gas inlet-side end of the substrate. Therefore, it is surmised that as the exhaust gas flow rate increases, the degree of contribution of surface pressure loss increases and better results can be achieved. In addition, as shown in Table 2 and FIG. 6, OSC tends to decrease as the density proportion (100×A/C) in the upstream side portion 10a decreases. The upstream side portion 10a comes into contact with exhaust gas having the highest content of harmful components, and therefore has a large reaction contribution. Therefore, it is surmised that as the quantity of OSC material in the upstream side portion 10a decreases, OSC tends to decrease. From the perspective of achieving both a reduction in pressure loss and an improvement in OSC performance, the coat density A in the upstream side portion 10a relative to the average coat density C throughout the catalyst coat layer is preferably such that $0.5\ C \le A \le 0.9\ C$, and more preferably such that $0.6\ C \le A \le 0.7\ C$ (for example, approximately 0.65 C). By setting the density proportion of coat density A in the upstream side portion 10a to fall within such a range, it is possible to effectively reduce pressure loss, especially in high load regions, while maintaining cleaning performance.

Specific examples of the present invention have been explained in detail above, but these are merely examples, and do not limit the scope of the invention. The features disclosed in the claims also encompass modes obtained by variously modifying or altering the specific examples shown above.

INDUSTRIAL APPLICABILITY

According to the present invention, it is possible to provide an exhaust gas cleaning catalyst in which an increase in pressure loss can be suppressed.

The invention claimed is:

1. An exhaust gas cleaning catalyst which is disposed in the exhaust pathway of an internal combustion engine and cleans exhaust gas emitted by the internal combustion engine, wherein the exhaust gas cleaning catalyst comprises a cylindrical substrate and a catalyst coat layer formed on a surface of the substrate,

TABLE 2

| | Upstream side portion | | | Downstream side portion | | Overall Average | | Pressure loss (kPa) | |
|---|---|---|---|---|---|---|---|---|---|
| | Width (%) | Density A (g/L) | 100 A/C (%) | Width (%) | Density B (g/L) | density C (g/L) | OSC | 5 m³/min | 7 m³/min |
| Working Example 2 | 40 | 80 | 41 | 60 | 271.6 | 195 | 1 | 0.634 | 0.954 |
| Working Example 3 | 40 | 100 | 51 | 60 | 258.3 | 195 | 1.145 | 0.637 | 0.958 |
| Working Example 4 | 40 | 175 | 90 | 60 | 208.3 | 195 | 1.327 | 0.655 | 0.98 |
| Comparative Example 6 | 40 | 195 | 100 | 60 | 195 | 195 | 1.35 | 0.676 | 1.01 |

As shown in Table 2 and FIG. 5, the pressure loss tends to decrease as the density proportion (100×A/C) of coat density A in the upstream side portion 10a relative to the average coat density C throughout the catalyst coat layer decreases. In particular, in cases where the exhaust gas flow rate was 7 m³/min, the exhaust gas cleaning catalysts of Working Examples 2 to 4 exhibited a better reduction in pressure loss than Comparative Example 6. As the exhaust gas flow rate increases, it becomes harder for the exhaust gas a ratio of the length L in a cylindrical axis direction of the substrate and the diameter D of a cross section orthogonal to the cylindrical axis direction is denoted by (L/D)≤0.8, the coat density of the catalyst coat layer differs between an upstream side portion that includes an exhaust gas inlet-side end of the substrate and a downstream side portion that includes an exhaust gas outlet-side end of the substrate, and the coat density A in the upstream side portion is lower than the coat density B in the downstream side portion (A<B), wherein the catalyst coat layer contains an OSC material having oxygen storage capacity, and when an average coat density throughout the catalyst coat layer is denoted by C, the coat density A in the upstream side portion is denoted by $0.5\,C \leq A \leq 0.9\,C$.

2. The exhaust gas cleaning catalyst according to claim 1, wherein the relationship between the coat density A in the upstream side portion and the coat density B in the downstream side portion satisfies $(A/B) \leq 0.85$.

3. The exhaust gas cleaning catalyst according to claim 1, wherein the coat density A in the upstream side portion is lower than the coat density B in the downstream side portion by 30 g/L or more.

4. The exhaust gas cleaning catalyst according to claim 1, wherein
- the upstream side portion includes a portion corresponding to at least 40% of the length of the substrate from the exhaust gas inlet-side end towards the exhaust gas outlet-side end of the substrate, and
- the downstream side portion includes a portion corresponding to at least 40% of the length of the substrate from the exhaust gas outlet-side end towards the exhaust gas inlet-side end of the substrate.

5. The exhaust gas cleaning catalyst according to claim 1, wherein the length L in the cylindrical axis direction of the substrate is 70 mm or less, and the diameter D of a cross section orthogonal to the cylindrical axis direction is 85 mm or more.

* * * * *